United States Patent [19]

Kondo et al.

[11] Patent Number: 5,118,769
[45] Date of Patent: Jun. 2, 1992

[54] MANUFACTURING METHOD OF POLYOLEFIN

[75] Inventors: Yozo Kondo, Yokkaichi; Mitsuhiro Mori, Aichi; Yutaka Naito, Komono; Hideyuki Takitani; Toshikazu Chikusa, both of Yokkaichi, all of Japan

[73] Assignee: Toyo Soda Manufacturing Co., Ltd., Shinnanyo, Japan

[21] Appl. No.: 217,140

[22] Filed: Jul. 5, 1988

Related U.S. Application Data

[63] Continuation of Ser. No. 97,384, Sep. 16, 1987, abandoned, which is a continuation of Ser. No. 845,444, Mar. 27, 1986, abandoned.

[30] Foreign Application Priority Data

Jan. 21, 1986 [JP] Japan .................................. 61-9016

[51] Int. Cl.$^5$ .................. C08F 4/654; C08F 4/656; C08F 10/00
[52] U.S. Cl. .................... 526/128; 502/119; 502/125; 526/122; 526/124; 526/127; 526/352
[58] Field of Search ............ 526/127, 128, 122

[56] References Cited

U.S. PATENT DOCUMENTS

| | | | |
|---|---|---|---|
| 4,004,071 | 1/1977 | Aishima et al. | 526/144 |
| 4,355,143 | 10/1982 | Lassalle et al. | 526/144 |
| 4,379,758 | 4/9183 | Wagner et al. | 526/125 |
| 4,418,184 | 11/1983 | Ueda et al. | 526/124 |
| 4,511,704 | 4/1985 | Tanaka et al. | 526/124 |
| 4,804,726 | 2/1989 | Kondo et al. | 526/352 |

FOREIGN PATENT DOCUMENTS

| | | | |
|---|---|---|---|
| 55-1265 | 8/1981 | Japan | 526/144 |
| 60-262802 | 12/1985 | Japan . | |

OTHER PUBLICATIONS

Abstract of Japan 85-262,802 inclosed.

Primary Examiner—Edward J. Smith
Attorney, Agent, or Firm—Oblon, Spivak, McClelland, Maier & Neustadt

[57] ABSTRACT

A manufacturing method of polyolefin is disclosed wherein the catalyst used for the polymerization of α-olefins at a temperature lower than the melting point of polymer in the presence of said Ziegler type catalyst and hydrogen comprises of (A) solid catalyst ingredient (A) obtained by allowing the reaction product of
  (i) at least one member selected from metallic magnesium and hydroxylated organic compounds and oxygen-containing organic compounds of magnesium,
  (ii) at least one kind of oxygen-containing organic compounds of titanium,
  (iii) at least one kind of organoaluminum compounds, and/or
  (iv) at least one kind of silicon compounds to react with
  (v) at least one kind of halogenated aluminum compounds,
(B) at least one kind of catalyst ingredients (B) selected from organometallic compounds, the metal of which belongs to Ia, IIa, IIb, IIIb or IVb group in the periodic table, and
(C) at least one kind of catalyst ingredients (C) selected from halogen-containing compounds comprising halogenated hydrocarbons, halogens, interhalogenous compounds and halides of aluminum, tin, lead, phosphorus, antimony and sulfur.

16 Claims, No Drawings

MANUFACTURING METHOD OF POLYOLEFIN

This application is a continuation of application Ser. No. 07/097,384, filed on Sep. 16, 1987, now abandoned which in turn is a continuation of application Ser. No. 06/845,444, filed on Mar. 27, 1986, now abandoned.

BACKGROUND OF THE INVENTION

The present invention relates to a manufacturing method of olefin polymer wherein the polymerization is conducted at a reaction temperature lower than the melting point of polymer in the presence of a novel catalyst system. In particular, the invention relates to a manufacturing method suitable for obtaining the olefin polymer having a weight average molecular weight of not less than 10,000 by the multistage polymerization method.

It has already been known to use the catalyst system comprising transition metal compound and organometallic compound for the low-pressure polymerization of olefins.

Recently, as a high-activity type catalyst, the catalyst system involving the reaction product of inorganic or organic magnesium compound with transition metal compound as an ingredient is used in many cases.

For example, in U.K. Specification No. 1,464,451 and U.S. Pat. No. 3,901,863, polymerization methods capable of manufacturing polyolefins having an extremely high impact resistance were disclosed, wherein the catalyst systems with an extremely high activity comprising catalyst ingredient (A) obtained by allowing magnesium metal and hydroxylated organic compounds or oxygen-containing organic compounds of magnesium etc., oxygen-containing organic compounds of transition metals and aluminum halide to react and catalyst ingredient (B) of organometallic compounds were used.

Moreover, so-called multistage polymerization system is also known publicly, wherein ethylene is polymerized through a plurality of polymerization processes different in the reaction conditions in the presence of these catalyst systems to control the molecular weight distribution within a wide range. Such polymerization methods are further classified roughly into a method conducting at a reaction temperature higher than the melting point of polymer and that conducting at a reaction temperature lower than the melting point.

The former method necessitates a large quantity of energy for heating etc. since the polymerization is conducted, for example, at 120° to 250° C. Moreover, since there is a restriction of solution viscosity to obtain homogeneous polymer, it has a disadvantageous point industrially that the productivity is low.

Whereas, the latter method does not cause the shortcoming aforementioned since the polymerization is conducted at a temperature lower than the melting point, but the method uses hydrogen ordinarily as a molecular weight modifier and a large quantity of hydrogen is necessary particularly in the polymerization process manufacturing polymer component of low molecular weight by the multistage polymerization method. At this time, there is an inconvenience with these Ziegler type catalyst systems having a high activity, since a reaction that a part of olefin is hydrogenated by hydrogen and paraffins such as ethane, propane, etc., which are disadvantageous industrially, are formed secondarily occurs to an extent impossible to neglect. As a result of this, there occur shortcomings that the yield of polymer per raw material olefin is lowered and the productivity becomes poor.

On the other hand, in the field of ethylene wax, Japanese Unexamined Patent Publication No. 164206/1980 disclosed a manufacturing method to obtain ethylene wax with a viscosity average molecular weight of less than 4,000 at a reaction temperature higher than about 140° C. using a catalyst comprising specific high activity titanium ingredient, organoaluminum ingredient and halogenous compound ingredient, but, in the manufacturing method to obtain high molecular weight olefin polymer with a weight average molecular weight of more than 10,000 at a reaction temperature lower than the melting point of polymer as in the present invention, any technique to inhibit the secondary formation of paraffin was not established.

Furthermore, by the method conducting the polymerization at a temperature lower than the melting point of polymer, the polymer is obtained ordinarily in a state of particles. For this reason, it is extremely important industrially that not only the catalyst system used has a high activity but also the particle properties of the polymer obtained are excellent in order to insure higher productivity.

However, the polymer particles obtainable in the presence of the catalysts disclosed in U.S. Pat. No. 3,901,863 etc. aforementioned were still insufficient in a point of powder characteristics, since a high ratio of fine particles were contained in the polymer particles due to smaller average diameter of particles or wider distribution of particle size.

Namely, when manufacturing the polyolefin, if the polymer particles have a particle size distribution as described above, various difficulties may be caused in the processes such as polymerization, particle separation from the polymer slurry, drying of the powder, transference of the powder, etc., and, in some cases, the continuous production over a long period of time may become impossible. Moreover, when polymer is made by the multistage polymerization method, if the particle size distribution of the polymer particles is wide, the classification of the powder is apt to occur at the formulation stage of the additives and the transportation stage after the drying process and, as the case may be, the polymer with stable quality cannot be obtained since the physical properties are different for every particle diameter.

In addition, the polymer obtainable with these catalyst systems was still insufficient in the molding properties. For example, at the time of the film molding, the wrinkles and slacks are formed on the film product since the melt extruded from die becomes unstable in the process of the solidification and, at the time of the blow molding, the peeling operation of needless portions from molded products, which is called flash separation, is not easy, the strength of molded articles is short because of the thinning of thickness at the pinch-off portion or the like, resulting in the insufficiency of the molding properties and the quality of products.

The method to conduct the polymerization at a reaction temperature lower than the melting point of polymer causes the shortcomings that the yield of polymer per raw material olefin is lowered and the productivity becomes poor as a result of the secondary formation of a large quantity of paraffin disadvantageous industrially at the time of ordinary polymerization, in particular, multistage polymerization, and, at the same time, the loss of raw materials such as ethylene etc. is unavoidable since the needless paraffin formed secondarily accumulates in the polymerization system and this is discharged to outside of the system.

In view of the situation, the inventors have continued the investigation diligently aiming at the provision of a polymerization method of olefins such that the catalyst has a high activity, the molding properties of polymer are excellent and the secondary formation of paraffin is inhibited.

As a result, a manufacturing method of olefin polymer has been found by the combination of specific catalyst ingredients, wherein the catalyst has a high activity, the secondary formation of industrially disadvantageous ethane is prevented and the polymer has a weight average molecular weight of not less than 10,000 and is excellent in the molding properties.

SUMMARY OF THE INVENTION

Namely, the invention provides a manufacturing method of polyolefin characterized in that, in the manufacturing method of polyolefin wherein the polymerization of $\alpha$-olefin is conducted at a reaction temperature lower than the melting point of polymer in the presence of Ziegler type catalyst with a high activity and hydrogen, said catalyst comprises of (A) solid catalyst ingredient (A) obtained by allowing the reaction product of
  (i) at least one member selected from metallic magnesium and hydroxylated organic compounds and oxygen-containing organic compounds of magnesium,
  (ii) at least one kind of oxygen-containing organic compounds of titanium,
  (iii) at least one kind of organoaluminum compounds, and/or
  (iv) at least one kind of silicon compounds to react with
  (v) at least one kind of halogenated aluminum compounds,
(B) at least one kind of catalyst ingredients (B) selected from a group of organometallic compounds, the metal of which belongs to Ia, IIa, IIb, IIIb or IVb group in the periodic table, and
(C) at least one kind of catalyst ingredients (C) selected from a group of halogen-containing compounds selected from a group of halogenated hydrocarbon compounds, halogens, interhalogenous compounds and halides of aluminum, tin, lead, phosphorus, antimony and sulfur.

DETAILED DESCRIPTION OF THE INVENTION

According to the invention, the catalyst has a high activity, the polymer excellent in the particle properties is obtainable, while the formation of by-product is inhibited and the molding properties of polymer produced can be improved.

The reason why the catalyst prepared and used in the invention has excellent properties is not clear, but it is considered that the reaction product obtained by allowing an uniform solution involving magnesium-containing reactant (i) and oxygen-containing organic compound of titanium (ii) (hereinafter referred to as Mg-Ti solution) to react with organoaluminum compound (iii) and/or silicon compound (iv) plays a role of nuclei for the formation of particles to produce the solid catalyst ingredient (A) excellent in the shape of the particles when reacting with subsequent halogenated aluminum compound (V), the reaction thereof being carried out for the purpose of the completion of the formation of catalyst particles, and, through the interaction between solid catalyst ingredient (A), catalyst ingredient (B) and catalyst ingredient (C), the high activity is attained, the formation of by-product is inhibited and the improvement in the molding properties and the hue and appearance of product is performed.

As a group comprising metallic magnesium and hydroxylated organic compounds aforementioned under (i), which are the reactants used for the preparation of solid catalyst ingredient (A) of the invention, followings can be mentioned.

As metallic magnesium, all of kinds in the shape, that is, powder, particle, foil, ribbon or the like can be used, and, as hydroxylated organic compounds, alcohols, organosilanols and phenols are suitable.

As alcohols, straight or branched chain aliphatic alcohols, alicyclic alcohols or aromatic alcohols having carbon atoms of 1 to 18 can be used. For example, methanol, ethanol, n-propanol, i-propanol, n-butanol, i-butanol, n-amyl alcohol, i-amyl alcohol, n-hexanol, 2-methyl pentanol, 2-ethyl hexanol, n-octanol, i-octanol, 1-decanol, 1-dodecanol, n-stearyl alcohol, cyclopentanol, cyclohexanol, ethylene glycol, etc. can be mentioned. Moreover, organosilanols have at least one hydroxyl group and the organic group is selected from alkyl group, cycloalkyl group, arylalkyl group, aryl group and alkylaryl group having carbon atoms of 1 to 12, preferably 1 to 6. Examples are as follows: trimethylsilanol, triethylsilanol, triphenylsilanol and t-butyldimethylsilanol.

Furthermore, as phenols, phenol, cresol, xylenol, hydroquinone etc. can be mentioned.

Among them, the use of alcohols is preferable. It is all right, of course, to use alcohols independently, but, in particular, the use of a mixture of straight chain aliphatic alcohol having carbon atoms of 2 to 18 with branched chain aliphatic alcohol having carbon atoms of 3 to 18 is preferable. In such case, the ratio in quantity of straight chain aliphatic alcohol to that of branched chain aliphatic alcohol is preferably within a range of 10:1 to 1:10, more preferably within a range of 3:1 to 1:3.

In addition to this, when the solid catalyst ingredient (A) of the invention is made using metallic magnesium, it is preferable to add one or more than two of substances which can react with metallic magnesium or form an addition compound with it, for example, polar substances such as iodine, mercuric chloride, alkyl halide, organic acid ester, organic acid, etc. for the purpose of promoting the reaction.

Next, as the compounds which belong to oxygen-containing organic compounds of magnesium, magnesium alkoxides, for example, methylate, ethylate, isopropylate, decanolate, methoxylethylate and cyclohexanolate, magnesium alkyl alkoxides, for example, ethyl ethylate, magnesium hydroalkoxides, for example, hydroxymethylate, magnesium phenoxides, for example, phenate, naphthenate, phenanthrenate and cresolate, magnesium carboxylates, for example, acetate, stearate, benzoate, phenyl acetate, adipate, sebacate, phthalate, acrylate and oleate, magnesium oximates, for example, butyl oximate, dimethyl glyoximate and cyclohexyl oximate, magnesium salts of hydroxamic acid, magnesium salts of hydroxylamine, for example, N-nitroso-N-phenylhydroxylamine derivative, magnesium enolates, for example, acetylacetonate, magnesium silanolates, for example, triphenyl silanolate, and complex alkoxides with magnesium and other metals, for example, $Mg[Al(OC_2H_5)_4]_2$ can be mentioned. These oxygen-containing organic compounds of magnesium are used independently or as a mixture of more than two.

As Oxygen-containing organic compounds of titanium which are the reactants aforementioned under (ii), compounds represented by a general formula $[TiOa(OR^2)b]m$ are used.

However, in said general formula, $R^2$ indicates a hydrocarbon group such as straight or branched chain alkyl group, cycloalkyl group, arylalkyl group, aryl group, alkylaryl group or the like having carbon atoms of 1 to 20, preferably 1 to 10, a and b which are $a \geq 0$ and $b > 0$, respectively, indicate numbers as compatible with the valency of titanium, and m indicates a natural number. Particularly, it is desirable to use such oxygen-containing organic compounds as a is $0 \leq a \leq 1$ and m is $1 \leq m \leq 6$.

As concrete examples, titanium tetraethoxide, titanium tetra-n-propoxide, titanium tetra-i-propoxide, titanium tetra-n-butoxide, hexa-i-propoxydititanate, etc. can be mentioned. The use of oxygen-containing organic compounds having several different hydrocarbon groups is also included within the range of the invention. These oxygen-containing organic compounds of titanium are used independently or as a mixture of more than two.

As organoaluminum compounds which are the reactants aforementioned under (iii), those which are represented by a general formula $R_3^1Al$ or $R_n^1AlY_{3-n}$ are used. However, in said general formula, $R^1$s indicate alkyl groups which may be same or different and have carbon atoms of 1 to 20, preferably 1 to 8, Y indicates an alkoxyl group, an aryloxyl group or a cycloalkoxyl group having carbon atoms of 1 to 20, preferably 1 to 8 or a halogen atom, and n indicates a number which is $1 \leq n < 3$.

Organoaluminum compounds described above can be used independently or as a mixture of more than two.

As concrete examples of organoaluminum compound, triethylaluminum, tri-i-butylaluminum, diethylaluminum chloride, ethylaluminum sesquichloride, i-butylaluminum dichloride, diethylaluminum ethoxide, etc. can be mentioned.

As silicon compounds which are the reactants aforementioned under (iv), polysiloxanes and silanes shown below are used.

As polysiloxanes, siloxane polymers, which have a chain, cyclic or three-dimensional structure and in the molecule of which one or more than two kinds of the repeating units represented by a general formula

(wherein $R^3$ and $R^4$ indicate atoms or residues capable of bonding to silicon such as hydrocarbon groups of alkyl group, aryl group, etc. having carbon atoms of 1 to 12, hydrogen, halogen, and alkoxyl group, aryloxyl group, fatty acid residue, etc. having carbon atoms of 1 to 12, $R^3$ and $R^4$ may be same or different, and f indicates normally a natural number ranging from 2 to 10,000) are included at various ratios and with various distributions, can be mentioned (However, such cases as all of $R^3$ and $R^4$ are hydrogen atoms or halogen atoms should be excluded). Concretely, as chain polysiloxanes, for example, hexamethyldisiloxane, octamethyltrisiloxane, dimethylpolysiloxane, diethylpolysiloxane, methylethylpolysiloxane, methylhydropolysiloxane, ethylhydropolysiloxane, butylhydropolysiloxane, hexaphenyldisiloxane, octaphenyltrisiloxane, diphenylpolysiloxane, phenylhydropolysiloxane, methylphenylpolysiloxane, 1,5-dichlorohexamethyltrisiloxane, 1,7-dichlorooctamethyltetrasiloxane, dimethoxypolysiloxane, diethoxypolysiloxane, diphenoxypolysiloxane, etc. can be mentioned.

As cyclic polysiloxanes, for example, hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane, triphenyltrimethylcyclotrisiloxane, tetraphenyltetramethylcyclotetrasiloxane, hexaphenylcyclotrisiloxane, octaphenylcyclotetrasiloxane, etc. can be mentioned.

As polysiloxanes having a three-dimensional structure, for example, those in which chain or cyclic polysiloxanes discribed above were made to have a crosslinking structure by heating etc. and others can be mentioned.

Such polysiloxanes are desirable to be in liquid state from a point of handling and to have a viscosity of 1 to 10,000 centistokes, preferably 1 to 1,000 centistokes at 25° C. However, they are not necessarily confined to the liquid and may be solid matters as called silicone grease collectively.

As silanes, silicon compounds represented by a general formula $H_qSi_rR_s^5X_t$ (wherein $R^5$s indicate groups capable of bonding to silicon such as hydrocarbon groups of alkyl group, aryl group, etc. having carbon atoms of 1 to 12 and alkoxyl group, aryloxyl group, fatty acid residue, etc. having carbon atoms of 1 to 12, respective $R^5$s may be of different kinds each other or of same kind, Xs indicate halogen atoms which may be of different kinds each other or of same kind, q, s and t are natural numbers larger than 0, and r is a natural number which is connected to q, s and t by $q+s+t=2r+2$.) can be mentioned.

Concretely, for example, silahydrocarbons such as trimethylphenylsilane, allyltrimethylsilane, etc., chain and cyclic organosilanes such as hexamethyldisilane, octaphenylcyclotetrasilane, etc., organosilanes such as methylsilane, dimethylsilane, trimethylsilane, etc., halogenated silicons such as silicon tetrachloride, silicon tetrabromide, etc., alkyl- and arylhalogenosilanes such as dimethyldichlorosilane, diethyldichlorosilane, n-butyltrichlorosilane, diphenyldichlorosilane, triethylfluorosilane, dimethyldibromosilane, etc., alkoxysilanes such as trimethylmethoxysilane, dimethyldiethoxysilane, tetramethoxysilane, diphenyldiethoxysilane, tetramethyldiethoxydisilane, dimethyltetraethoxydisilane, etc., haloalkoxy- and phenoxysilanes such as dichlorodiethoxysilane, dichlorodiphenoxysilane, tribromoethoxysilane, etc., silane compounds containing fatty acid residue such as trimethylacetoxysilane, diethyldiacetoxysilane, ethyltriacetoxysilane, etc. and the like can be mentioned.

Organosilicon compounds described above may be used independently or may be used after allowing more than two of them to mix or react.

As halogenated aluminum compounds which are the reactants aforementioned under (V), those represented by a general formula $R_z^6AlX_{3-z}$ are used. However, in said general formula, $R^6$ indicates a hydrocarbon group having carbon atoms of 1 to 20, preferably 1 to 8, X indicates a halogen atom, and z indicates a number which is $0 \leq z < 3$, preferably $0 \leq z \leq 2$. Moreover, $R^6$ is preferable to be selected from straight or branched chain alkyl group, cycloalkyl group, arylalkyl group, aryl group and alkylaryl group.

Halogenated aluminum compounds described above can be used independently or as a mixture of more than two.

As concrete examples of halogenated aluminum compounds, for example, aluminum trichloride, diethylaluminum chloride, ethylaluminum dichloride, i-butylaluminum dichloride, a mixture of triethylaluminum and aluminum trichloride, etc. can be mentioned.

The solid catalyst ingredient (A) to be used in the invention can be prepared by allowing the reaction product obtained through the reaction between reactant (i) and (ii) aforementioned to react with reactant (iii) and/or reactant (iv), and further with reactant (v).

It is preferable to conduct these reactions in the liquid medium. For the sake of this, the reactions should be conducted in the presence of inert organic solvent particularly when these reactants themselves are not liquid under the operating conditions or when the amounts of the liquid reactants are not ample. As the inert organic solvents, all of ones which are used ordinarily in the technical field concerned can be used, but aliphatic, alicyclic or aromatic hydrocarbons, halogenated derivatives thereof, or mixtures thereof can be mentioned. For example, isobutane, hexane, heptane, cyclohexane, benzene, toluene, xylene, monochlorobenzene, etc. are used preferably.

The order of the reactions of reactant (i), (ii), (iii) and/or (iv) is possible to be arbitrary as long as the chemical reactions take place. Namely, for example, a method to add silicon compound to a mixture of magnesium compound with titanium compound, a method to add organoaluminum compound to a mixture of magnesium compound with titanium compound followed by the addition of silicon compound, a method to mix magnesium compound, titanium compound and silicon compound simultaneously, a method to add titanium compound to magnesium compound and silicon compound and the like are conceivable. The method to add organoaluminum compound to a mixture of magnesium compound with titanium compound and then to add silicon compound is preferable because of the excellence in the powder characteristics.

By allowing the product thus obtained to react with halogenated aluminum compound, the solid catalyst ingredient (A) can be obtained.

The amounts of the reactants to be used for the preparation of solid catalyst ingredient (A) in the invention are not particularly confined, but it is preferable that the gram atom of magnesium (Mg), the gram atom of titanium in the titanium compound (Ti), the gram equivalent of alkoxyl group or aryloxyl group in the silicon compound (S) when using silicon compounds involving alkoxyl group or aryloxyl group and the gram atom of halogen (X) are selected at rates satisfying following two equations. Namely, they are selected within the ranges of $1/20 \leq Mg/Ti \leq 200$, more preferably $2 \leq Mg/Ti \leq 200$ and $1/5 \leq P \leq 10$, more preferably $1 \leq P \leq 10$ $$\left( P = \frac{Mg}{Ti + Mg} \times \frac{X}{4Ti + 2Mg + S} \right).$$

By polymerizing the olefin in combination of solid catalyst ingredinet (A) prepared within these ranges with catalyst ingredient (B), the polymer which has an appropriate molecular weight distribution and which is excellent in the powder characteristics is obtained with an extremely high activity of catalyst and further the product excellent in the molding properties and extremely exceeding in the hue and appearance can be obtained. If Mg/Ti is too large out of these ranges, it becomes difficult to obtain uniform Mg-Ti solution at the time of the catalyst preparation or the activity of catalyst becomes low at the time of the polymerization. Inversely, if it is too small, the activity of catalyst also becomes low resulting in the occurrence of problems such that the product is colored to make the hue poor and the like. Moreover, if P is out of range, the activity of catalyst becomes low and, as a result, the improvement in the powder characteristics cannot be expected. In addition, the facts result that the molding properties become poor and gels and fish eyes are caused most frequently to damage the appearance of films and sheets produced.

Although it is possible not to use the organoaluminum compounds aforementioned under (iii) at all, the use of them is preferable when regarding the powder characteristics as important.

When using the organoaluminum compound $R_3{}^1Al$ or $R_n{}^1AlY_{3-n}$ (wherein n is $1 \leq n < 3$) aforementioned under (iii), it is preferable to select the amount for use so as the atomic ratio of gram atom of Al in said compound (hereinafter referred to as Al(iii)) multiplied by n (in the case of $R_3{}^1Al$, this is gram atom of $Al \times 3$) to the gram atom of Ti in the titanium compound aforementioned under (ii) to lie within a range of $$\frac{1}{10} \times \frac{n}{n - 0.5} \leq \frac{n \times Al(iii)}{Ti} \leq 100 \times \frac{n}{n - 0.5},$$

preferably $$\frac{1}{2} \times \frac{n}{n - 0.5} \leq \frac{n \times Al(iii)}{Ti} \leq 80 \times \frac{n}{n - 0.5}.$$

If $$\frac{n \times Al(iii)}{Ti}$$

is too large out of this range, the activity of catalyst becomes low and, if it is too small, a result is incurred that the improvement in the powder characteristics cannot be expected.

It is preferable to select the amount of silicon compound so as the atomic ratio of the gram atom of Mg in the magnesium compound aforementioned under (i) to the gram atom of Si in the silicon compound aforementioned under (iv) to lie within a range of $1/20 \leq Mg/Si \leq 100$, preferably $1/5 \leq Mg/Si \leq 10$. If Mg/Si is too large out of this range, the improvement in the powder characteristics is insufficient. Inversely, if it is too small, a result is incurred that the activity of catalyst is low.

The amount of halogenated aluminum compound aforementioned under (v) is selected so as P to lie within a range as described above. When using further the organoaluminum compound aforementioned under (iii), it is preferable to select so as the atomic ratio of the gram atom of Al in the organoaluminum compound (iii) aforementioned (Al(iii)) to the gram atom of Al in the halogenated aluminum compound (v) (hereinafter referred to as Al(v)) to lie within a range of $1/20 \leq \text{Al(iii)}/\text{Al(v)} \leq 10$, preferably $1/10 \leq \text{Al(iii)}/\text{Al(v)} \leq 5$. If the atomic ratio Al(iii)/Al(v) is out of this range, a result is incurred that the improvement in the powder characteristics cannot be expected.

The reaction conditions at respective steps are not particularly critical, but the reactions are conducted at a temperature ranging from $-50°$ to $300°$ C., preferably from $0°$ to $200°$ C., for 0.5 to 50 hours, preferably 1 to 6 hours in an atmosphere of inert gas under normal or applied pressure.

The solid catalyst ingredient (A) thus obtained may be used as it is. But, it is used generally in a form suspended into the inert organic solvent after filtered or decanted to remove the unreacted matters and by-products remained behind and washed several times with the inert organic solvent. One from which the inert organic solvent was removed by isolating after washing and heating under normal or reduced pressure can also be used.

In the invention, as the organometallic compounds of the metal belonging to Ia, IIa, IIb, IIIb or IVb group in the periodic table, which are the catalyst ingredients (B), organometallic compounds comprising metals such as lithium, magnesium, zinc, tin, aluminum, etc. and organic groups can be mentioned. As the organic groups described above, alkyl group can be mentioned typically. As such alkyl group, straight or branched chain alkyl group having carbon atoms of 1 to 20 is used. As the organometallic compounds having such organic group, for example, n-butyllithium, diethylmagnesium, diethylzinc, trimethylaluminum, triethylaluminum, tri-i-butylaluminum, tri-n-butylaluminum, tri-n-decylaluminum, tetraethyltin, tetrabutyltin, etc. can be mentioned. In particular, the use of trialkylaluminum is preferable, which has straight or branched chain alkyl group having carbon atoms of 1 to 10.

In addition to these, as the ingredients (B), alkylmetal hydrides which have alkyl group having carbon atoms of 1 to 20 can be used. As such compounds, di-i-butylaluminum hydride, trimethyltin hydride, etc. can be mentioned concretely. Moreover, alkylmetal alkoxides which have alkyl group having carbon atoms of 1 to 20, for example, diethylaluminum ethoxide etc. can also be used.

Besides, the organoaluminum compounds obtained through the reaction of trialkylaluminum or dialkylaluminum hydride which has alkyl group having carbon atoms of 1 to 20 with diolefin having carbon atoms of 4 to 20, for example, compound such as isoprenylaluminum can also be used.

Furthermore, the aluminoxane compounds in which more than two of aluminum atoms are bonded through oxygen atom or nitrogen atom, for example, tetramethylaluminoxane, polymethylaluminoxane, etc. can also be used.

As halogen-containing compounds which are the catalyst ingredients (C) used in the invention, halogenated hydrocarbon compounds such as propyl chloride, n-butyl chloride, sec-butyl chloride, tert-butyl chloride, n-amyl chloride, n-octyl chloride, n-butyl bromide, chlorobenzene, benzyl chloride, methylene dichloride, 1,1-dichloroethane, 1,2-dichloroethane, 1,2-dichloropropane, 1,3-dichloropropane, 1,4-dichlorobutane, 1,6-dichlorohexane, 1,1,2-trichloroethane, 1,1,2,2-tetrachloroethane, carbon tetrachloride, chloroform, etc., halogens such as chlorine, bromine and iodine, interhalogenous compounds such as iodine monochloride, iodine trichloride, fluorine trichloride, chlorine bromide, etc., halides of aluminum, tin, lead, phosphorus, antimony and sulfur such as aluminum trichloride, diethylaluminum chloride, ethylaluminum dichloride, i-butylaluminum dichloride, stannous chloride, stannic chloride, lead tetrachloride, phosphorus trichloride, phosphorus oxytrichloride, phosphorus pentachloride, antimony pentachloride, thionyl chloride, sulfuryl chloride, etc. are exemplified.

Among them, halogenated aliphatic hydrocarbon compounds having carbon atoms of 1 to 12 and halogen atoms of 2 to 4 are preferable and, in particular, those having halogen atoms of 2 exert so remarkable effect that they are preferable specially. These halogen-containing compounds are used independently or as a mixture of more than two.

Moreover, the use of ones in the liquid state is preferable generally and, when not in the liquid state under the operating conditions, it is better to use after diluting with inert organic solvent.

Upon putting the invention into practice, the amount of catalyst ingredient (A) used is preferable to be equivalent to 0.001 to 2.5 mmol of titanium atom per 1 l of solvent or per 1 l of the reactor, and it can also be raised to a higher concentration depending on the polymerization conditions.

The organometallic compound which is the ingredient (B) is used at a concentration of 0.02 to 50 mmol, preferably 0.2 to 5 mmol per 1 l of solvent or per 1 l of the reactor.

The halogen-containing compound which is the ingredient (C) is used at a concentration of 0.00001 to 500 mmol, preferably 0.0001 to 100 mmol per 1 l of solvent or per 1 of the reactor.

And, in the mode of embodiment, it is necessary that the metal in the organometallic compound being the catalyst ingredient (B) is aluminum and that the amounts of catalyst ingredient (B) and catalyst ingredient (C) are selected so as the atomic ratio of halogen in the catalyst ingredient (C) to aluminum in the catalyst ingredient (B) to lie within a range of $0 < X/Al \leq 1$ (X is halogen), more preferably $0.3 \leq X/Al \leq 1$. If X/Al is too large, a result is incurred that the polymerization activity is low and, if it is too small, the improvement in the particle properties and the molding properties may be insufficient in some cases.

The feeding mode of three ingredients of the invention into the polymerization vessel is not particularly confined and, for example, a method to feed ingredient (A), ingredient (B) and ingredient (C) into the polymerization vessel each separately, a method to allow ingredient (A) to contact with ingredient (C) and then ingredient (B) to contact with them to polymerize, a method to allow ingredient (B) to contact with ingredient (C) and then ingredient (A) to contact with them to polymerize, a method to allow ingredient (A), ingredient (B) and ingredient (C) to contact beforehand to polymerize, or the like can be adopted.

The polymerization of olefin is conducted at a reaction temperature lower than the melting point of polymer in the liquid phase or gas phase.

When the polymerization is conducted in the liquid phase, it is preferable to use inert solvent. As the inert solvents, all of ones which are used ordinarily in the technical field concerned can be used, but alkanes and cycloalkanes having carbon atoms of 4 to 20, for example, i-butane, pentane, hexane, cyclohexane, etc. are suitable particularly.

In the manufacturing method of polyolefin according to the invention, as olefins to allow to polymerize, α-olefins represented by a general formula $R-CH=CH_2$ (wherein R indicates hydrogen or a straight or branched chain, substituted or unsubstituted alkyl group having carbon atoms of 1 to 10, in particular, 1 to 8) can be mentioned. Concretely, ethylene, propylene, 1-butene, 1-pentene, 4-methyl-1-pentene, 1-octene, etc. are mentioned. Moreover, copolymerization can also be conducted using mixtures of not less than two of α-olefins described above or mixtures of α-olefin with dienes such as butadiene, isoprene, etc. In particular, it is preferable to use ethylene, mixtures of ethylene with α-olefins aforementioned except ethylene, or mixtures of ethylene with dienes.

The polymerization of olefin according to the invention can be conducted by the ordinary method, but the effect is exerted particularly when adopting the multistage polymerization system. The multistage polymerization system called so here means the system manufacturing through a plurality of polymerization processes consisting of a process to produce the polymer of relatively low molecular weight component and a process to produce that of relatively high molecular weight component. A proper example of such multistage polymerization is disclosed minutely in Japanese Unexamined Patent Publication No. 161405/1981. Namely, for example, at prestage, at least two polymerization processes, one allowing to form high molecular weight polymer and the other allowing to form low molecular weight polymer, are conducted in parallel. Following this, at poststage, the reaction mixtures containing the polymers formed in respective prestage polymerization processes and remaining as they are mixed together to make a new united reaction mixture and, in the presence thereof, the polymerization process allowing to form the polymer having a molecular weight which resides in the center of molecular weights of polymers formed in respective polymerization processes aforementioned is conducted. Moreover, for example, it is also possible that high molecular weight component is formed in the poststage process after the formation of low molecular weight component in the prestage process, or inversely, that low molecular weight component is formed after the formation of high molecular weight component.

The reaction conditions in the invention are not confined particularly as long as the reaction temperature is lower than the melting point of polymer, but the reaction temperature is selected to be 20° to 110° C. and the pressure to be 2 to 50 $Kg/cm^2 G$ ordinarily.

Moreover, in the invention, polyolefins having a weight average molecular weight of not less than 10,000 are manufactured. It is necessary generally that the polyolefins have both physical properties of the solid and those of the melt appropriately. If the weight average molecular weight is less than 10,000, the manufacture of molded articles through the injection molding, extrusion molding, blow molding, etc. is impossible since the fluidity becomes too high and the physical properties of the solid become too poor.

The concentration of hydrogen to control the weight average molecular weight is 0.001 to 20 ordinarily to the concentration of olefin when expressed as a ratio, partial pressure of hydrogen/partial pressure of olefin. Particularly, at the time of the multistage polymerization, it is selected to be 0.01 to 20 in the process of the formation of low molecular weight component and 0 to 0.1 in the process of the formation of high molecular weight component. Here, it is necessary to select the molecular weights of both low molecular weight component and high molecular weight component aiming at that the average molecular weight of them is consistent with that of object polymer and that the difference in molecular weights of them meets the width of the molecular weight distribution of object polymer.

As the reactors to be used in respective polymerization processes, all ones can be used properly if only they are used normally in the technical field concerned. For example, the polymerization procedure can be conducted by any system of continuous system, semi-batch system or batch system using agitation bath type reactor or circulation type reactor.

The effect of the invention is first focused into a point that the powder characteristics of polymer are remarkable. Namely, according to the invention, polymer with a high bulk density can be obtained which contains only small amounts of fine particles and further has an average particle diameter of appropriate size. Moreover, it is also possible to obtain the polymer with an extremely narrow particle size distribution. These facts are of great significance industrially. In other words, in the polymerization process, the formation of the deposits is hindered in the polymerization device and, in the processes of separation and drying of polymer, the scattering of the fine particles of polymer to outside of the system is prevented as well as the separation and the filtration of polymer slurry become easy. In addition, the drying efficiency is enhanced due to the improvement in the fluidity. Moreover, at the transportation stage, the bridging etc. do not occur in the silo and the troubles on transference are dissolved. Furthermore, it becomes possible to supply the polymer with constant quality.

Moreover, if the particle size distribution of the polymer particles is narrow, the grains and the unevenness do not occur in the molded articles, since the classification of particles is difficult to occur and the homogeneous particles are obtained particularly when producing the polymer with a wide molecular weight distribution by the multistage polymerization method.

The second effect of the invention lies in a high activity of catalyst, that is, the weight of polymer obtainable per unit weight of the solid catalyst ingredient (A) is markedly high. Moreover, the activity per unit weight of Ti is also extremely high, for example, at the time of the polymerization of ethylene, the activity per 1 gram of titanium used and per 1 $Kg/cm^2$ of partial pressure of ethylene exceeds 10,000 normally. In the most preferable case, this value exceeds 100,000. Accordingly, such problems as the deterioration, coloring, etc. can be avoided at the time of the molding of polymer.

As the third effect of the invention, it is possible to reduce remarkably the amount of paraffin formed secondarily at the time of the polymerization. Namely, in accordance with the invention, industrially disadvantageous secondary formation of paraffin is inhibited to make it possible to manufacture without the damage in the productivity, particularly even when manufacturing the polyolefins with a wide molecular weight distribution.

The fourth effect of the invention lies in that, through the possibility in the inhibition of the amount of paraffin formed secondarily to a remarkably low extent, the accumulation of useless ethane becomes extremely low in the polymerization system and the discharge of gas in the system, which has been inevitable hitherto to remove this, can also be extremely reduced in proportion. Consequently, the loss of raw materials such as olefin, hydrogen, etc. to outside of the system accompanying this discharge is minimized resulting in the improvement in productivity.

In consideration of both the prevention of loss of olefin due to this and that of secondary formation of olefin aforementioned, it is possible to reduce the loss of raw material olefin to an extent from a half to less than one tenth compared with that in the past when adopting a preferable mode of embodiment.

The fifth effect of the invention is that the processibility and the quality of molded articles can be improved at the time of the film molding and blow molding of polymer. Namely, at the time of the film molding by inflation, the diameter of pinched-in portion, which is called neck diameter, is narrow when the bubble pushed out from the die is blown up, and, because of the extreme stability of the shape of bubble, excellent film without wrinkles and slacks can be obtained. Moreover, at the time of the blow molding, hollow bottles, the roughness thereof being excellent, the lug removal being easy therefrom and the shape of pinch off being also excellent, can be obtained. Therefore, the polymer according to the invention is useful as the grades for film molding and blow molding.

In following, the invention is illustrated based on the examples, but the invention is not confined in any way by these examples. Besides, in examples and comparative examples, HLMI/MI means a ratio of high load melt index (HLMI, in accordance with the condition F in ASTM D-1238) to melt index (MI, in accordance with the condition E in ASTM D-1238), and is a measure of the molecular weight distribution. If the value of HLMI/MI is small, the molecular weight distribution is considered to be narrow.

The activity indicates the weight of polymer produced (g) per 1 g of the solid catalyst ingredient (A). The Ti activity indicates the weight of polymer produced (g) per 1 g of Ti contained in the solid catalyst ingredient (A). The extent of the particle diameter distribution of polymer particles is expressed by the common logarithm of geometric standard deviation (hereinafter referred to as $\sigma$) obtained by the publicly known method from the approximate straight line through the points plotted the result of the classification of polymer particles with sieves an the probability logarithm paper. Moreover, the average particle diameter is a value read off the particle diameter corresponding to 50% cumulative value in weight with which approximate straight line aforementioned intersects.

The molding was evaluated on the sample of polymer particles pelletized at a temperature of extruded resin of 200° C. using a single-screw extruder with a screw diameter of 25 mm$\phi$. The film molding of balanced film was evaluated using a balanced film former with a screw diameter of 25 mm$\phi$ and a die diameter of 30 mm$\phi$. The fish eyes (hereinafter referred to as FE) were measured by the visual observation on the film with a thickness of 30 $\mu$ molded at a blow ratio of 4.0. The molding properties were judged by the visual evaluation of the stability at the time of the molding of balanced film (stiffness of bubble and degree of deformation).

Moreover, the evaluation of blow-molded articles was made by molding 300 cc round bottles using a blow molding machine with a screw diameter of 30 mm$\phi$ and observing the state of surface texture thereof, the relative difficulty of lug removal and the minimum thickness at the pinch off portion visually.

The weight average molecular weight of polymer was determined by means of gel permeation chromatography of o-dichlorobenzene solution. Moreover, ethane formed secondarily was determined quantitatively by means of gas chromatography to express as a rate of secondary formation (amount of ethane formed secondarily/amount of polymer produced $\times 100$ (%)).

EXAMPLE 1

(a) Preparation of solid catalyst ingredient (A)

In 1.6 l autoclave fitted with an agitation device were placed 70 g (0.94 mol) of n-butanol, and to this were added 0.55 g of iodine, 11 g (0.45 mol) of metallic magnesium powder and 61 g (0.18 mol) of titanium tetrabutoxide. After added 450 ml of hexane further, the temperature was raised to 80° C., and the mixture was agitated for 1 hour under sealing with nitrogen excluding hydrogen generated. Without a break, the temperature was raised to 120° C., and the reaction was conducted for 1 hour to obtain Mg-Ti solution.

To a flask with an inner volume of 500 ml were charged 0.048 mol in terms of Mg in Mg-Ti solution and, after raised the temperature to 45° C., a solution of tri-i-butylaluminum (0.048 mol) dissolved into hexane was added over 1 hour. Following the addition of all of the solution, the mixture was agitated for 1 hour at 60° C. Then, 2.8 ml (0.048 gram atom of silicon) of methylhydropolysiloxane (viscosity of about 30 centistokes at 25° C.) were added and the reaction was conducted for 1 hour under refluxing. After cooling to 45° C., 90 ml of 50% hexane solution dissolved i-butylaluminum dichloride were added over 2 hours. Hereby, Mg/Ti corresponds to 2.5 and P to 1.9. After all of the solution were added, the mixture was agitated for 1 hour at 70° C. To the product was added hexane, and the product was washed 15 times by the decantation method. In this way, a slurry of the solid catalyst ingredient (A) (containing 9.5 g of solid catalyst ingredient (A)) suspended into hexane was obtained. A portion of the slurry was sampled and dried under an atmosphere of nitrogen after removed the supernatant. From the elemental analysis, Ti was found to be 8.9 wt. %.

(b) Polymerization of ethylene

After substituted the inside of electromagnetic agitation type stainless steel autoclave with an inner volume of 10 l with nitrogen sufficiently, 6.0 l of hexane were charged, and the inner temperature was adjusted to 80° C. Thereafter, 1.19 g (6.0 mmol) of tri-i-butylaluminum as the catalyst ingredient (B), 75 mg of 1,2-dichloroethane as the catalyst ingredient (C) and the slurry containing 75 mg of the solid catalyst ingredient (A) obtained in (a) described above were added in sequence. After adjusted the inner pressure of autoclave to 1 kg/cm$^2$G, hydrogen was added in amounts corresponding to 4 kg/cm$^2$ and then, adding ethylene continuously so as to make the inner pressure of autoclave 11.0 kg/cm²G, polymerization was conducted for 1.5 hours.

After the completion of polymerization, the autoclave was cooled and the unreacted gas was purged. Polyethylene taken out was separated from the solvent by filtration. As a result, 2130 g of polyethylene having a MI of 0.18 g/10 min, a HLMI/MI of 72 and a bulk density of 0.39 g/cm³ were obtained. The activity corresponded to 28000 g/g and the Ti activity to 315 kg/g. Moreover, the rate of secondary formation of ethane was 0.005%.

The polymer powder thus obtained was evaluated by molding into 300 cc round bottles using a blow molding machine with a screw diameter of 30 mm$\phi$, after pelletized using an extruder with a screw diameter of 25 mm$\phi$. In consequence, the molded articles showed to have extremely excellent surface texture and the removal of lugs was also very easy.

EXAMPLE 2 THROUGH 8, COMPARATIVE EXAMPLE 1 AND 2

As shown in Table 1, experiments were carried out varying only the kind and the addition amount of ingredient (C), respectively, from the method in Example 1. Namely, the polymerization was conducted using the solid catalyst ingredient (A) prepared in Example 1 and tri-i-butylaluminum as in Example 1, while, in Example 2, varying the amount of 1,2-dichloroethane used and, in Example 3 through 8 and Comparative example 1 and 2, varying the kind of ingredient (C). As a result, it was observed that examples were superior to comparative examples in the rate of the secondary formation of ethane at the time of polymerization, the surface texture of molded articles and the easiness of lug removal.

ducted by the multistage polymerization method. Namely, employing two electromagnetic agitation type stainless steel reactors with an inner volume of 5 l, to one of them were charged 3 l of hexane and, after adjusted the inner temperature to 85° C., 1.7 g (8.5 mmol) of tri-i-butylaluminum as the catalyst ingredient (B), 200 mg of 1,2-dichloroethane as the catalyst ingredient (C) and 200 mg of solid catalyst ingredient (A) were added. After adjusted the inner pressure of reactor to 1 kg/cm²G with nitrogen gas, hydrogen was added in amounts corresponding to a partial pressure of 19.0 kg/cm², and further, adding ethylene continuously so as to make the total pressure 25 kg/cm²G, polymerization was conducted for 65 minutes to manufacture low molecular weight polymer.

To other reactor were charged 3 l of hexane, and 1.7 g (8.8 mmol) of tri-i-butylaluminum, 100 mg of 1,2-dichloroethane as the catalyst ingredient (C) and 100 mg of solid catalyst ingredient (A) were added. After adjusted the inner pressure of reactor to 1 kg/cm²G with nitrogen gas, hydrogen was added in amount corresponding to a partial pressure of 0.1 kg/cm², and further, adding ethylene continuously so as to make the total pressure 4.0 kg/cm²G, polymerization was conducted for 65 minutes to manufacture high molecular weight polymer.

Then, respective reaction mixtures containing these polymers were fed to an agitation type reactor with an inner volume of 10 l through connecting pipe under pressure. After substituted the gas phase in this reactor with nitrogen, inner temperature and inner pressure were made 80° C. and 1.0 kg/cm²G, respectively. Hydrogen was added in amounts corresponding to a partial pressure of 1.2 kg/cm², and further, supplying ethylene

TABLE 1

| No. | Kind of Catalyst ingredient (C) | Addition amount (mg) | Yield of polymer (g) | Activity (g/g) | MI (g/10 min) | HLMI/MI | Bulk density (g/cm³) |
|---|---|---|---|---|---|---|---|
| Example 2 | 1,2-Dichloroethane | 150 | 2110 | 28000 | 0.18 | 75 | 0.39 |
| Example 3 | 1,1,2-Trichloroethane | 75 | 1860 | 25000 | 0.17 | 65 | 0.41 |
| Example 4 | 1,1,2,2-Tetrachloroethane | 75 | 1810 | 24000 | 0.15 | 72 | 0.40 |
| Example 5 | 1,4-Dichlorobutane | 75 | 2190 | 29000 | 0.18 | 72 | 0.40 |
| Example 6 | 1,1-Dichloroethane | 75 | 1870 | 25000 | 0.17 | 68 | 0.42 |
| Example 7 | 1,3-Dichloropropane | 75 | 2030 | 27000 | 0.19 | 70 | 0.40 |
| Example 8 | Iodine trichloride | 75 | 1860 | 25000 | 0.19 | 68 | 0.40 |
| Comparative example 1 | — | — | 1530 | 20000 | 0.21 | 60 | 0.39 |
| Comparative example 2 | Silicon tetrachloride | 75 | 1580 | 21000 | 0.21 | 58 | 0.39 |

| No. | Rate of sec. formation of ethane (%) | Surface texture | Lug removal | Min. thickness at pinch-off portion |
|---|---|---|---|---|
| Example 2 | 0.004 | Extremely excellent | Extremely easy | Thick |
| Example 3 | 0.008 | Excellent | Easy | Thick |
| Example 4 | 0.011 | Excellent | Easy | Thick |
| Example 5 | 0.006 | Extremely excellent | Extremely easy | Thick |
| Example 6 | 0.013 | Extremely excellent | Easy | Thick |
| Example 7 | 0.008 | Extremely excellent | Extremely easy | Thick |
| Example 8 | 0.017 | Excellent | Easy | Thick |
| Comparative example 1 | 0.108 | Poor | Difficult | Thin |
| Comparative example 2 | 0.101 | Poor | Difficult | Thin |

EXAMPLE 9

Using the solid catalyst ingredient (A) prepared in Example 1, the polymerization of ethylene was conducted continuously so as to make the total pressure 5.2 kg/cm²G, polymerization was conducted for 45 minutes. The reaction mixture was filtered off and dried. The amount of polymer obtained was 2450 g. Moreover, as a result of getting hold of the amounts produced at respective stages by the flow rate of ethylene, the production rates were 40 wt. % for the low molecular weight polymer at prestage, also 40 wt. % for the high molecular weight polymer at same stage and 20 wt. % at poststage, respectively. The weight average molecular weight of low molecular weight polymer was 31000 and the rate of secondary formation of ethane was 0.056%.

The polymer powder obtained was pelletized using an extruder with a screw diameter of 25 mmφ. MI of these pellets was 0.054 and HLMI/MI was 200. These pellets were evaluated under the conditions of temperature of resin of 215° C., blow-up ratio of 4.0 and thickness of film of 30μ using an inflation film former with a screw diameter of 25 mmφ. In consequence, the film molding could be made in an extremely stable state of bubble and excellent film without wrinkles, slacks, gels and unevenesses was obtained.

COMPARATIVE EXAMPLE 3

The experiment was carried out without using 1,2-dichloroethane being the ingredient (C) by the method in Example 9. As a result, the amount of polyethylene obtained was 1930 g and the rate of secondary formation of ethane was 0.226%.

Moreover, MI and HLMI/MI of pellets were 0.058 and 190, respectively, and the bubble was unstable at the time of the film-forming resulting in the occurrence of wrinkles and slacks.

EXAMPLE 10

Employing the same device as in Example 1 and using, as the reactants, 37 g (0.50 mol) of n-butanol, 30 g (0.50 mol) of i-propanol, 0.55 g of iodine, 11 g (0.45 mol) of metallic magnesium powder and 61 g (0.18 mol) of titanium tetrabutoxide and 450 ml of hexane, the reaction was conducted under the same conditions as in Example 1 to obtain the Mg-Ti solution.

To a flask with a volume of 500 ml were added 0.052 mol in terms of Mg in this Mg-Ti solution and these were allowed to react with diethylaluminum chloride (0.10 mol) by the same method as (a) in Example 1. After the completion of reaction, the temperature was lowered to room temperature and, adding hexane, the product was washed 3 times by the decantation method. Following this, methylhydropolysiloxane (0.10 gram atom of silicon) and further i-butylaluminum dichloride (0.28 mol) were allowed to react by the same method as (a) in Example 1 to obtain a slurry of solid catalyst ingredient (A). Mg/Ti and P corresponded to 2.5 and 2.4, respectively, and the content of Ti was 9.0 wt. %.

Using the solid catalyst ingredient (A) thus obtained and 1,2-dichloroethane as the ingredient (C), polyethylene was manufactured by the multistage polymerization method as in Example 9 to make the evaluation. Consequently, the weight average molecular weight of low molecular weight polymer was 34000, the rate of secondary formation of ethane was 0.060%, and the amount of polymer produced was 2560 g, which had a MI of 0.055 and a HLMI/MI of 210. The bubble showed an extremely stable state at the time of the film-forming and excellent film without wrinkles, slacks, grains and unevennesses was obtained.

EXAMPLE 11

Using the solid catalyst ingredient (A) prepared in Example 10, the polymerization of ethylene was conducted by the two-stage polymerization method.

After substituted the inside of electromagnetic agitation type stainless steel reactor with an inner volume of 10 l with nitrogen sufficiently, 6 l of hexane were charged and the inner temperature was adjusted to 85° C. Thereafter, 1.19 g (6.0 mmol) of tri-i-butylaluminum as the catalyst ingredient (B), 150 mg of 1,2-di-chloroethane as the ingredient (C) and 150 mg of solid catalyst ingredient (A) prepared in Example 10 were added in sequence. After adjusted the inside of reactor to 1 kg/cm²G with nitrogen gas, hydrogen was added in amounts corresponding to 16.0 kg/cm², and, adding ethylene continuously so as to make the total pressure 20 kg/cm²G, polymerization was conducted for 60 minutes to manufacture low molecular weight polymer.

Then, the gas phase in this reactor was substituted with nitrogen, and inner temperature and inner pressure were made 75° C. and 1.0 kg/cm²G, respectively. Hydrogen was added in amount corresponding to a partial pressure of 1.0 kg/cm², and further, supplying ethylene continuously so as to make the total pressure 5.0 kg/cm²G, polymerization was conducted for 45 minutes. The reaction mixture was filtered off and dried to obtain 2690 g of polymer. The activity corresponded to 17,900 g/g and the Ti activity to 199 kg/g. Moreover, as a result of getting hold of the amounts produced at respective stages by the flow rate of ethylene, the production rates were 50 wt. % for the low molecular weight polymer at prestage and also 50 wt. % for the high molecular weight polymer at poststage. The weight average molecular weight of low molecular weight polymer was 31,000 and the rate of secondary formation of ethane was 0.008%.

The polymer powder obtained showed a bulk density of 0.43 g/cm³, a rate of fine particles, the particle diameter thereof being less than 105μ (hereinafter referred to as content of fine particles) of 2.9 wt. %, a σ of 0.12 and an average particle diameter of 190μ. When this powder was pelletized and molded into film by the same method as in Example 9, MI and HLMI/MI were 0.057 and 200, respectively, the bubble at the time of the film-forming was stable and excellent film with extremely few FE and without wrinkles, slacks, grains and unevennesses can be obtained.

EXAMPLE 12 THROUGH 15, COMPARATIVE EXAMPLE 4

Experiments were carried out using various halogen compounds in Example 12 through 15 and not using any one in Comparative example 4 in place of 1,2-dichloroethane used as the ingredient (C) for the polymerization in Example 11. These results are shown in Table 2.

TABLE 2

| No. | Catalyst ingredient (C) | Activity (g/g) | Ti activity (kg/g) | MI (g/10 min) | HLMI/MI | Bulk density (g/cm³) | Content of fine particles (%) | σ |
|---|---|---|---|---|---|---|---|---|
| Example 12 | 1,1,2-Trichloroethane | 18000 | 200 | 0.06 | 190 | 0.41 | 3.0 | 0.13 |
| Example 13 | 1,1,2,2-Tetrachloroethane | 17000 | 190 | 0.05 | 190 | 0.42 | 3.7 | 0.15 |
| Example 14 | 1,4-Dichlorobutane | 19000 | 211 | 0.06 | 200 | 0.40 | 3.1 | 0.12 |

TABLE 2-continued

| | | | | | | | | |
|---|---|---|---|---|---|---|---|---|
| Example 15 | Iodine Trichloride | 16500 | 183 | 0.06 | 190 | 0.40 | 3.9 | 0.15 |
| Comparative example 4 | — | 14000 | 156 | 0.08 | 170 | 0.40 | 3.4 | 0.14 |

| No. | Average particle diameter (μ) | Weight av. molecular weight (Low m.w. polymer) | Rate of sec. formation of ethane (%) | Stability at time of film-forming | FE |
|---|---|---|---|---|---|
| Example 12 | 170 | 33000 | 0.013 | Extremely stable | Extremely few |
| Example 13 | 160 | 36000 | 0.021 | Extremely stable | Extremely few |
| Example 14 | 180 | 32000 | 0.010 | Extremely stable | Extremely few |
| Example 15 | 160 | 38000 | 0.036 | Stable | Extremely few |
| Comparative example 4 | 170 | 29000 | 0.248 | Unstable | Many |

EXAMPLE 16

Using the solid catalyst ingredient (A) prepared in Example 10, the polymerization of ethylene was conducted by the two-stage polymerization method under different conditions from those in Example 11. Namely, after substituted the inside of electromagnetic agitation type stainless steel reactor with an inner volume of 10 l with nitrogen sufficiently, 6.0 l of hexane were charged and the inner temperature was adjusted to 85° C. Thereafter, 1.19 g (6.0 mmol) of tri-i-butylaluminum as the catalyst ingredient (B), 150 mg of 1,2-dichloroethane as the ingredient (C) and 150 mg of solid catalyst ingredient (A) prepared in Example 9 were added in sequence. After adjusted the inside of reactor to 1 kg/cm$^2$G with nitrogen gas, hydrogen was added in amounts corresponding to 10.8 kg/cm$^2$, and, adding ethylene continuously so as to make the total pressure 13.7 kg/cm$^2$G, polymerization was conducted for 70 minutes to manufacture the low molecular weight polymer.

Then, the gas phase in this reactor was substituted with nitrogen and inner temperature and inner pressure were made 80° C. and 1.0 kg/cm$^2$G, respectively. Hydrogen was added in amounts corresponding to a partial pressure of 0.8 kg/cm$^2$, and further, supplying ethylene continuously so as to make the total pressure 4.5 kg/cm$^2$G, polymerization was conducted for 45 minutes to manufacture the high molecular weight polymer. The amount of polymer obtained was 2450 g and the activity and the Ti activity were 16,300 g/g and 180 kg/g, respectively. The production rates at respective stages were 50 wt. % for the low molecular weight polymer at prestage and also 50 wt. % for the high molecular weight polymer at poststage. The weight average molecular weight of low molecular weight polymer was 53,000 and the rate of secondary formation of ethane was 0.010%.

The polyethylene thus obtained showed a MI of 0.44, a HLMI/MI of 86, a bulk density of 0.41 g/cm$^3$, a content of fine particles of 3.1 wt. %, a σ of 0.13 and an average particle diameter of 190μ.

After pelletized this polyethylene, the evaluation was made by molding into 300 cc round bottles by the use of blow molding machine. The molded articles had extremely excellent surface texture, the minimum thickness at the pinch-off portion was thick and the lug removal was also very easy.

EXAMPLE 17 THROUGH 20, COMPARATIVE EXAMPLE 5

Experiments were carried out using various halogen compounds in Example 17 through 20 and not using any one in Comparative example 5 in place of 1,2-dichloroethane used as the ingredient (C) for the polymerization in Example 16. Results are shown in Table 3.

TABLE 3

| No. | Catalyst ingredient (C) | Activity (g/g) | Ti activity (kg/g) | MI (g/10 min) | HLMI/MI | Bulk density (g/cm$^3$) | Content of fine particles (%) | σ | Average particle diameter (μ) |
|---|---|---|---|---|---|---|---|---|---|
| Example 17 | 1,1,2-Trichloroethane | 16200 | 180 | 0.34 | 98 | 0.41 | 2.8 | 0.13 | 160 |
| Example 18 | 1,1,2,2-Tetrachloroethane | 15400 | 171 | 0.32 | 96 | 0.41 | 3.2 | 0.14 | 160 |
| Example 19 | 1,4-Dichlorobutane | 17100 | 190 | 0.40 | 91 | 0.39 | 3.0 | 0.13 | 180 |
| Example 20 | Iodine trichloride | 15000 | 167 | 0.41 | 92 | 0.40 | 3.7 | 0.14 | 170 |
| Comparative example 5 | — | 12500 | 139 | 0.46 | 90 | 0.39 | 3.9 | 0.15 | 170 |

| No. | Weight av. molecular weight (Low m.w. polymer) | Rate of sec. formation of ethane (%) | Surface texture | Lug removal | Min. thickness at pinch-off portion |
|---|---|---|---|---|---|
| Example 17 | 51000 | 0.010 | Extremely excellent | Easy | Thick |
| Example 18 | 50000 | 0.017 | Extremely excellent | Easy | Thick |
| Example 19 | 54000 | 0.009 | Extremely excellent | Easy | Thick |
| Example 20 | 50000 | 0.028 | Excellent | Easy | Thick |
| Comparative | 44000 | 0.191 | Poor | Difficult | Thin |

TABLE 3-continued example 5

EXAMPLE 21

(a) Preparation of solid catalyst ingredient (A)

In 1.6 l autoclave fitted with an agitation device were placed 32.2 g (0.42 mol) of n-butanol, and to this were added 0.2 g of iodine, 4.86 g (0.20 mol) of metallic magnesium powder and 27.2 g (0.08 mol) of titanium tetrabutoxide. After added 200 mol of hexane further, the temperature was raised to 80° C., and the mixture was agitated for 1 hour under sealing with nitrogen excluding hydrogen generated. Without a break, the temperature was raised to 120° C., and the reaction was conducted for 1 hour. Thereafter, 153 g (0.2 gram atom of silicon) of dimethylpolysiloxane (viscosity of 50 centistokes at 25° C.) were fed at 120° C. under pressure with nitrogen to allow to react for 1 hour at 120° C.

Then, 340 ml of hexane were added, the temperature was lowered to 45° C. and 348 ml of 50% hexane solution dissolved ethylaluminum dichloride were added over 3 hours. After added all of the solution, the temperature was raised and the mixture was agitated for 1 hour at 60° C. Hexane was added to the product and washing was made 15 times by the decantation method. Thus, a slurry of solid catalyst ingredient (A) suspended into hexane [containing 38 g of solid catalyst ingredient (A)] was obtained. A portion of the slurry was sampled and dried under an atmosphere of nitrogen after removed the supernatant. From the analysis, the content of Titanium was found to be 9.3 wt. %.

(b) Polymerization of ethylene

The polymerization of ethylene was conducted by the two-stage polymerization method similar to Example 11. The amount of polymer obtained was 2680 g, and the production rates at respective stages were 50 wt. % for the low molecular weight polymer at prestage and also 50 wt. % for the high molecular weight polymer at poststage. Moreover, the rate of secondary formation of ethane was 0.023%.

The polymer powder obtained was pelletized by the same method as in Example 9 and molded into film. As a result, MI and HLMI/MI were 0.056 and 200, respectively, the bubble was stable at the time of the film-forming and excellent film with few FE and without wrinkles, slacks, grains and unevenneses was obtained.

EXAMPLE 22 THROUGH 24

The preparation of solid catalyst ingredient (A) and the polymerization of ethylene were conducted by the same procedure as in Example 21. However, in place of dimethylpolysiloxane used as the silicon compound (iv) in Example 21, various compounds were used. Namely, methylphenylpolysiloxane (viscosity of 500 centistokes at 25° C.) was used in Example 22, diphenyldiethoxysilane in Example 23 and tetramethoxylsilane in Example 24.

Using respective catalysts, the polymerization of ethylene was conducted by the same procedure as in Example 11. Results are shown in Table 4.

COMPARATIVE EXAMPLE 6

The preparation of solid catalyst ingredient and the polymerization of ethylene were conducted by the same procedure as in Example 21. However, dimethylpolysiloxane as the silicon compound and 1,2-dichloroethane as the catalyst ingredient (C) were not used. Results are shown in Table 4.

TABLE 4

| No. | Silicon compound Kind | Amount used (gram atom) | Mg/Ti | P | Activity (g/g) | Ti activity (Kg/g) | MI (g/10 min) | HLMI/MI | Bulk density (g/cm³) | Content of fine particles (%) |
|---|---|---|---|---|---|---|---|---|---|---|
| Example 21 | Dimethyl-polysiloxane | 0.20 | 2.5 | 2.4 | 18200 | 196 | 0.056 | 200 | 0.42 | 1.6 |
| Example 22 | Methylphenyl-polysiloxane | 0.20 | 2.5 | 2.4 | 17200 | 182 | 0.061 | 190 | 0.43 | 2.7 |
| Example 23 | Diethoxyl-diphenylsilane | 0.08 | 2.5 | 1.5 | 16400 | 188 | 0.054 | 200 | 0.45 | 2.0 |
| Example 24 | Tetraethoxyl-silone | 0.08 | 2.5 | 1.1 | 17100 | 181 | 0.059 | 190 | 0.43 | 1.8 |
| Comparative example 6 | — | — | 2.5 | 2.4 | 13000 | 134 | 0.063 | 180 | 0.34 | 8.9 |

| No. | σ | Average particle diameter (μ) | Weight av. molecular weight (Low m.w. polymer) | Rate of sec. formation of ethane (%) | Stability at time of film-forming | FE |
|---|---|---|---|---|---|---|
| Example 21 | 0.28 | 230 | 31000 | 0.023 | Stable | Few |
| Example 22 | 0.24 | 220 | 31000 | 0.021 | Stable | Few |
| Example 23 | 0.27 | 220 | 34000 | 0.015 | Stable | Few |
| Example 24 | 0.24 | 240 | 33000 | 0.018 | Stable | Few |
| Comparative example 6 | 0.38 | 290 | 24000 | 0.267 | Unstable | Many |

EXAMPLE 25

(a) Preparation of solid catalyst ingredient (A)

In 1.6 l autoclave fitted with an agitation device were placed 37 g (0.50 mol) of n-butanol and 65 g (0.50 mol) of 2-ethylhexanol, and to this were added 0.55 g of iodine, 11 g (0.45 mol) of metallic magnesium powder and 15 g (0.044 mol) of titanium tetrabutoxide. After added 450 ml of hexane further, the temperature was raised to 80° C. and the mixture was agitated for 1 hour under sealing with nitrogen excluding hydrogen generated. Without a break, the temperature was raised to 120° C. and the reaction was conducted for 1 hour to obtain Mg-Ti solution.

To a flask with an inner volume of 500 ml were added 0.048 mol in terms of Mg in Mg-Ti solution, and, after raised the temperature to 45° C., a hexane solution dissolved diethylaluminum chloride (0.048 mol) was added over 1 hour. After added all of the solution, the mixture was agitated for 1 hour at 60° C. Then, 5.6 ml (0.096 gram atom of silicon) of methylhydropolysiloxane (viscosity of about 30 centistokes at 25° C.) were added, and the mixture was allowed to react for 1 hour under refluxing. After cooling to 45° C., 80 ml of 50% hexane solution dissolved i-butylaluminum dichloride were added over 2 hours. After the completion of addition, the mixture was agitated at 70° C. Adding hexane, the product was washed 15 times by the decantation method. In this way, a slurry of solid catalyst ingredient (A) (containing 12.6 g of solid catalyst ingredient (A)) suspended into hexane was obtained. A portion of the slurry was sampled and dried under an atmosphere of nitrogen after removed the supernatant. From the elemental analysis, Ti was found to be 3.6 wt. %.

(b) Polymerization of ethylene

The polymerization of ethylene was conducted by the two-stage polymerization method similar to Example 11. The amount of polymer obtained was 2810 g, and the activity and the Ti activity were 18,700 g/g and 520 kg/g, respectively. The production rates at respective stages were 50 wt. % for the low molecular weight polymer at prestage and also 50 wt. % for the high molecular weight polymer at poststage. Moreover, the weight average molecular weight of low molecular weight polymer was 38,000 and the rate of secondary formation of ethane was 0.036%.

The polymer powder obtained showed a bulk density of 0.44 g/cm$^3$, a content of fine particles of 3.3 wt. %, a $\sigma$ of 0.13 and an average particle diameter of 150$\mu$. This powder was pelletized by the same method as in Example 9 and molded into film. MI and HLMI/MI were 0.058 and 190, respectively, the bubble was stable at the time of the film-forming, and excellent film without wrinkles, slacks, grains and unevennesses was obtained.

EXAMPLE 26 THROUGH 29

The preparation of solid catalyst ingredient (A) and the polymerization of ethylene were conducted by the same procedure as in Example 25. However, the kind and the amount of reactants used for the manufacture of solid catalyst ingredient (A) were varied. Namely, the preparation of solid catalyst ingredient (A) was made varying alcohols to 1-decanol (0.50 mol) and i-propanol (0.50 mol) in Example 26 and to 1-dodecanol (0.50 mol) and i-propanol (0.50 mol) in Example 27. In Example 28, the amount of titanium tetrabutoxide used was varied to 15 g (0.044 mol) and, in Example 29, alcohols were varied to n-octanol (0.50 mol) and 2-ethylhexanol (0.50 mol) and the amount of titanium tetrabutoxide used was made 4 g (0.012 mol).

Using respective solid catalyst ingredients (A) thus obtained, the polymerization of ethylene was conducted by the same procedure as in Example 11. Results are shown in Table 5.

TABLE 5

| No. | Alcohols Straight chain aliphatic | Alcohols Branched chain aliphatic | Mg/Ti | P | Activity (g/g) | Ti activity (kg/g) | MI (g/10 min) | HLMI/MI | Bulk density (g/cm$^3$) | Content of fine particles (%) | $\sigma$ |
|---|---|---|---|---|---|---|---|---|---|---|---|
| Example 25 | n-Butanol | 2-Ethyl-hexanol | 10.2 | 3.5 | 18700 | 520 | 0.058 | 190 | 0.44 | 3.3 | 0.13 |
| Example 26 | 1-Decanol | i-Propanol | 10.2 | 3.5 | 20300 | 560 | 0.060 | 170 | 0.44 | 4.3 | 0.15 |
| Example 27 | 1-Dodecanol | i-Propanol | 10.2 | 3.5 | 17000 | 500 | 0.058 | 180 | 0.45 | 3.1 | 0.13 |
| Example 28 | n-Butanol | 2-Ethyl-hexanol | 18.8 | 4.0 | 13000 | 765 | 0.062 | 160 | 0.44 | 3.3 | 0.16 |
| Example 29 | n-Octanol | 2-Ethyl-hexanol | 37.5 | 4.2 | 11300 | 1256 | 0.066 | 140 | 0.44 | 4.8 | 0.16 |

| No. | Average prticle diameter ($\mu$) | Weight av. molecular weight (Low m.w. polymer) | Rate of sec/formation of ethane (%) | Stability at time of film-forming | FE |
|---|---|---|---|---|---|
| Example 25 | 150 | 38000 | 0.036 | Extremely stable | Extremely few |
| Example 26 | 130 | 33000 | 0.038 | Extremely stable | Extremely few |
| Example 27 | 140 | 36000 | 0.036 | Extremely stable | Extremely few |
| Example 28 | 160 | 31000 | 0.041 | Extremely stable | Extremely few |
| Example 29 | 110 | 29000 | 0.044 | Extremely stable | Extremely few |

EXAMPLE 30

Experiment was carried out by the same method as in Example 25 except that small amounts of 1-butene were added at the time of the poststage polymerization in the method of Example 25. Namely, after the prestage low molecular weight polymer was manufactured using solid catalyst ingredient (A) prepared in Example 25, tri-i-butylaluminum and 1,2-dichloroethane similarly to Example 25, 30 g of 1-butene were supplied at the time of the poststage high molecular weight polymerization to conduct the polymerization. Consequently, the weight average molecular weight of low molecular weight polymer was 38000 and the rate of secondary formation of ethane was 0.035% at the time of the polymerization.

The polymer powder obtained showed a bulk density of 0.43 g/cm$^3$, a content of fine particles of 3.5 wt. %, a $\sigma$ of 0.13 and an average particle diameter of 140$\mu$. This powder was pelletized by the same method as in Example 9 and molded into film. MI and HLMI/MI were 0.060 and 180, respectively, the bubble was stable at the time of the film-forming, and excellent film without wrinkles, slacks, grains and unevennesses was obtained.

EXAMPLE 31

Using the solid catalyst ingredient (A) prepared in Example 25, the polymerization of propylene was conducted. Namely, after substituted the inside of electro-magnetic agitation type stainless steel autoclave with an inner volume of 2 l with nitrogen sufficiently, 1.2 l of hexane were charged and the inner temperature was adjusted to 70° C. Thereafter, 68 mg (0.60 mmol) of triethylaluminum as the catalyst ingredient (B), 40 mg of 1,2-dichloroethane as the catalyst ingredient (C), 45 mg (0.3 mmol) of ethyl benzoate and the slurry containing 40 mg of solid catalyst ingredient (A) obtained in Example 25 were added in sequence. After adjusted the inner pressure of autoclave to 1 kg/cm$^2$G, hydrogen was added in amount corresponding to 1 kg/cm$^2$, and then, adding propylene continuously so as to make the inner pressure of autoclave 11.0 kg/cm$^2$G, polymerization was conducted for 1.5 hours. After the completion of polymerization, unreacted gas was purged, and polypropylene taken out was separated from the solvent by filtration and dried.

As a result, 84 g of polypropylene having a MFR (melt flow rate according to condition L of ASTM D-1238) of 1.9 and a bulk density of 0.34 g/cm$^3$ were obtained. The activity corresponded to 2100 g/g. Moreover, the Ti activity was 58.3 kg/g. The average particle diameter of polymer particles, the content of fine particles and $\sigma$ were 210$\mu$, 2.3 wt. % and 0.13, respectively. Moreover, I.I. of polymer particles determined from the extraction by boiling heptane was 91.3%.

EXAMPLE 32

(a) Preparation of solid catalyst ingredient (A)

In 1.6l autoclave fitted with an agitation device were placed 21.3 g (0.2 mol) of diethoxylmagnesium and, after added 68 g (0.2 mol) of titanium tetrabutoxide to this, the temperature was raised to 120° C. to conduct the reaction for 1 hour. Following this, 153 g (0.2 gram atom of silicon) of dimethylpolysiloxane (viscosity of about 50 centistokes at 25° C.) were fed at 120° C. under pressure with nitrogen and the reaction was conducted for 1 hour at 120° C. After the reaction, 340 ml of hexane were added and, after cooling to 45° C., 186 g (1.2 mol) of i-butylaluminum dichloride diluted to 50 wt. % with hexane were added over 3 hours. After added all of the solution, the mixture was agitated for 1 hour at 60° C. to obtain the solid catalyst ingredient (A). The content of Ti in this solid catalyst ingredient (A) was found to be 12.4 wt. %.

(b) Polymerization of ethylene

The polymerization of ethylene was conducted by the two-stage polymerization method same as in Example 11. The amount of polymer obtained was 2170 g and the activity and the Ti activity were 14,500 g/g and 117 kg/g, respectively. The production rates at respective stages were 50 wt. % for the low molecular weight polymer at prestage and also 50 wt. % for the high molecular weight polymer at poststage. Moreover, the weight average molecular weight of low molecular weight polymer was 33000 and the rate of secondary formation of ethane was 0.043%.

The polymer powder obtained showed a bulk density of 0.42 g/cm$^3$, a content of fine particles of 2.5 wt. %, a $\sigma$ of 0.26 and an average particle diameter of 250$\mu$. When this powder was pelletized by the same method as in Example 9 and molded into film, MI and HLMI/MI were 0.062 and 180, respectively, the bubble was stable at the time of the film-forming, and excellent film with few wrinkles, slacks, grains and unevennesses was obtained.

EXAMPLE 33

Except that 150 mg of solid catalyst ingredient (A) prepared in Example 29, 119 mg (0.6 mmol) of tri-i-butylaluminum as the catalyst ingredient (B) and 639 mg (5.3 mmol) of diethylaluminum chloride as the catalyst ingredient (C) were used, the polymerization of ethylene was conducted by the two-stage polymerization method same as in Example 11.

The amount of polymer obtained was 2250 g, and the activity and the Ti activity corresponded to 15,000 g/g and 1667 kg/g, respectively. The production rates were 50 wt. % for the low molecular weight polymer at prestage and also 50 wt. % for the high molecular weight polymer at poststage. The weight average molecular weight of low molecular weight polymer was 22,000 and the rate of secondary formation of ethane was 0.107%.

Moreover, the polymer particles obtained showed a bulk density of 0.48 g/cm$^3$, an average particle diameter of 140$\mu$, a $\sigma$ of 0.13 and a content of fine particles of 3.5%.

Then, the polymer particles obtained were pelletized by the same method as in Example 9 and molded into film. MI and HLMI/MI of pellets were 0.055 and 176, respectively. The bubble at the time of the film-forming was extremely stable and the fish eyes were extremely few counting 60/m$^2$.

EXAMPLE 34

Except that 150 mg of solid catalyst ingredient (A) prepared in Example 29, 119 mg (0.6 mmol) of tri-i-butylaluminum as the catalyst (B) and 639 mg (5.3 mmol) of diethylaluminum chloride as the catalyst ingredient (C) were used, the polymerization of ethylene was conducted by the two-stage polymerization method in the same way as in Example 16. The activity and the Ti activity were 19,000 g/g and 2111 kg/g, respectively. Moreover, the weight average molecular weight of low molecular weight polymer was 39,000 and the rate of secondary formation of ethane was 0.06%.

The polymer particles showed a bulk density of 0.45 g/cm$^3$, an average particle diameter of 210$\mu$, a $\sigma$ of 0.13 and a content of fine particles of 1.7%.

Then, the polymer particles obtained were pelletized as in Example 1, and blow-molded into 300 cc round bottles. MI and HLMI/MI of pellets were 0.42 and 92, respectively. The surface texture of molded articles was extremely excellent and the lug removal was also easy.

What is claimed is:

1. A process for the preparation of a polyolefin having a weight average molecular weight of not less than 10,000 by the polymerization of an $\alpha$-olefin at a reaction temperature lower than the melting point of the polyolefin by a multistage polymerization process in the presence of a Ziegler type catalyst with a high activity and hydrogen, wherein said catalyst comprises:

(A) a solid reaction product obtained by reacting in a homogeneous solution
  (i) at least one reaction product of metallic magnesium with at least one straight or branched chain aliphatic alcohol, alicyclic alcohol or aromatic alcohol having 1-18 carbon atoms, or mixtures thereof
  (ii) at least one oxygen-containing organic compound of titanium of the formula $(TiO_a(OR^2)_b)_m$ wherein $R^2$ is a $C_{1-20}$ hydrocarbon group, a and b are $a \geq 0$ and $b > 0$, respectively, and indicate numbers compatible with the valency of titanium, and m is a natural number, with
  (iii) at least one organoaluminum compound of the formula $R_3^1Al$ or $R_n^1AlY_{3-n}$, wherein $R^1$ is a $C_{1-20}$ alkyl group, Y is alkoxy, aryloxy, cycloalkoxy or halogen, and n indicates a number $1 \leq n < 3$, wherein when said organoaluminum compound has the formula $R_n^1AlY_{3-n}$ the atomic ratio of gram atom of Al in said organoaluminum compounds (iii) multiplied by n to the gram atom of Ti in (ii) lies within the range of $$\frac{1}{2} \times \frac{n}{n - 0.5} \leq \frac{n \times Al(iii)}{Ti} \leq 80 \times \frac{n}{n - 0.5}$$

$$\left[\frac{1}{10} \times \frac{n}{n - 0.5} \leq \frac{n \times Al(iii)}{Ti} \leq 100 \times \frac{n}{n - 0.5}\right];$$

and wherein, when the said organoaluminum compound has the formula $R_3^1Al$, the atomic ratio of gram atoms of aluminum in said organoaluminum compound multiplied by 3, to the gram atoms of titanium in the titanium compounds falls within the range of $$0.6 \leq \frac{3 \times Al}{Ti} \leq 96,$$

then with (iv) at least one silane or polysiloxane, wherein said polysiloxane has the formula:

$$-(\underset{R^4}{\underset{|}{\overset{R^3}{\overset{|}{Si}}}}-O-)_f$$

wherein $R^3$ and $R^4$ are the same or different and are $C_{1-12}$ alkyl, $C_{1-12}$ aryl, hydrogen, halogen, $C_{1-12}$ alkoxyl, $C_{1-12}$ aryloxyl, or $C_{1-12}$ fatty acid, with the proviso that $R^3$ and $R^4$ cannot both be hydrogen or halogen, and wherein f ranges from about 2 to 10,000; and wherein said silane has the formula:

$H_qSi_rR_s^5X_t$ where $Rs^5$ are groups capable of bonding to silicon which are $C_{1-12}$ alkyl, $C_{1-12}$ aryl, $C_{1-12}$ alkoxyl, $C_{1-12}$ aryloxyl, or $C_{1-12}$ fatty acid; X is halogen; q, s, and t are natural numbers larger than 0; and r is a natural number related to q, s and t as $q + s + t = 2r + 2$, wherein the amount of said polysiloxane or silane compound is selected such that the atomic ratio of gram atom of Mg in said reaction product (i) being within the range of $120 \leq Mg/Si \leq 100$, and thereafter with
  (v) at least one halogenated aluminum compound of the formula $R_z^6AlX_{3-z}$ wherein $R^6$ is a $C_{1-8}$ hydrocarbon group, X is halogen, and z is $0 \leq z \leq 2$, the atomic ratio of gram atoms of Al in said organoaluminum compound (iii) to gram atoms of Al in said halogenated aluminum compound (v) being within the range of $1/10 \leq Al(iii)/Al(v) \leq 5$,
(B) at least one organometallic compound wherein the metal is of Groups Ia, IIa, IIb, IIIb or IVb of the Periodic Table, and
(C) at least one halogen-containing compound selected from the group consisting of halogenated $C_{2-4}$ saturated aliphatic hydrocarbon groups having 2-4 halogen atoms, halogens, and interhalogenous compounds, wherein the gram atom of magnesium (Mg), the gram atom of titanium in titanium compounds (Ti), the gram equivalent of alkoxyl groups or aryloxyl groups in silicon compounds (S) when using silicon compounds having alkoxyl groups or aryloxyl group, and the gram atom of halogen (X) are selected so as to satisfy the following two equations $$2 \leq Mg/Ti \leq 200$$
and
$$1 \leq P \leq 10 \text{ wherein } P = \frac{Mg}{Ti + Mg} \times \frac{X}{4\,Ti \times 2\,Mg} + S$$

wherein ingredient (A) is present in an amount equivalent to 0.001 to 2.5 mmol of titanium atom per 1 l of the reactor, ingredient (B) is present at a concentration of 0.02 to 50 mmol per 1 l of the reactor, and ingredient (C) is present at a concentration of 0.00001 to 500 mmol per 1 l of solvent if present or per 1 l of the reactor.

2. The process according to claim 1, wherein the organoaluminum compounds (iii) are compounds represented by a general formula $R_3^1Al$ (wherein $R^1$ indicates an alkyl group having carbon atoms of 1 to 20).

3. The process according to claim 1, wherein the organoaluminum compounds (iii) are compounds represented by a general formula $R_n^1AlY_{3-n}$ (wherein $R^1$ indicates an alkyl group having carbon atoms of 1 to 20, Y indicates an alkoxyl, aryloxyl or cycloalkoxyl group or a halogen atom, and n indicates a number, $1 \leq n < 3$).

4. The process according to claim 1, wherein the hydroxylated organic compounds (i) are alcohols, and at least one member selected from mixtures of straight chain aliphatic alcohol having carbon atoms of 2 to 18 with branched chain aliphatic alcohol having carbon atoms of 3 to 18 is used as the alcohol.

5. The process according to claim 4, wherein the ratio of the quantity of straight chain aliphatic alcohol to branched chain aliphatic alcohol is from 10:1 to 1:10.

6. The process according to claim 5, wherein the ratio of the quantity of straight chain aliphatic alcohol to branched chain aliphatic alcohol is from 3:1 to 1:3.

7. The process according to claim 1, wherein the halogenated aliphatic hydrocarbon compound is at least one compound having two halogen atoms.

8. The process according to claim 1, wherein the polymerization of olefins is conducted through a plurality of polymerization processes consisting of a process obtaining relatively low molecular weight component and a process obtaining relatively high molecular weight component.

9. The method of claim 1, wherein said polysiloxane is selected from the group consisting of hexamethyldisiloxane, octamethyltrisiloxane, dimethylpolysiloxane, diethylpolysiloxane, methylethylpolysiloxane, methylhydropolysiloxane, ethylhydropolysiloxane, butylhydropolysiloxane, hexaphenyldisiloxane, octaphenyltrisiloxane, diphenylpolysiloxane, phenylhydropolysiloxane, methylphenylpolysiloxane, 1,5-dichlorohexamethyltrisiloxane, 1,7-dichlorooctamethyltetrasiloxane, diethoxypolysiloxane, and diphenoxypolysiloxane.

10. The method of claim 1, wherein said polysiloxane is a cyclic polysiloxane selected from the group consisting of hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane, triphenyltrimethylcyclotrisiloxane, tetraphenyltetramethylcyclotetrasiloxane, hexaphenylcyclotrisiloxane and octaphenylcyclotetrasiloxane.

11. The method of claim 1, wherein said silane is selected from the group consisting of trimethylphenylsilane, allyltrimethylsilane, hexamethyldisilane, octaphenylcyclotetrasilane, methylsilane, dimethylsilane, trimethylsilane, silicon tetrachloride, silicon tetrabromide, dimethyldichlorosilane, diethyldichlorosilane, n-butyltrichlorosilane, diphenyldichlorosilane, triethylfluorosilane, dimethyldibromosilane, trimethylmethoxysilane, dimethyldiethoxysilane, tetramethoxysilane, diphenyldiethoxysilane, tetramethyldiethoxydisilane, dimethyltetraethoxydisilane, dichlorodiethoxysilane, dichlorodiphenoxysilane, tribromoethoxysilane, trimethylacetoxysilane, diethyldiacetoxysilane, and ethyltriacetoxysilane.

12. The process according to claim 1, wherein $R^6$ is a straight or branched chain alkyl group.

13. The process according to claim 1, wherein ingredient (B) is present at a concentration of 0.2 to 5 mmol per 1 l of solvent if present or per 1 l of the reactor, and ingredient (C) is present at a concentration of 0.0001 to 100 mmol per 1 l of solvent if present or per 1 l of the reactor.

14. The process according to claim 1, wherein ingredient (C) is 1,1-dichloroethane, 1,2-dichloroethane, 1,2-dichloropropane, 1,3-dichloropropane, 1,4-dichlorobutane, 1,1,2-trichloroethane or 1,1,2,2-tetrachloroethane.

15. The process according to claim 1, wherein ingredient (C) is chlorine, bromine or iodine.

16. The process according to claim 1, wherein ingredient (C) is iodine monochloride, iodine trichloride, fluorine trichloride or chlorine bromide.

* * * * *